United States Patent [19]

Gutierrez Atencio

[11] 4,345,159

[45] Aug. 17, 1982

[54] HYDROPOWERED BULKHEAD

[76] Inventor: Francisco J. Gutierrez Atencio, Estafeta Dr., Garcia 3101, Diamante Entre Rios, Argentina

[21] Appl. No.: 169,185

[22] Filed: Jul. 15, 1980

[51] Int. Cl.³ ............................................. F03B 13/08
[52] U.S. Cl. ........................................ 290/43; 290/52; 405/78
[58] Field of Search ............................ 405/75, 78, 111; 290/52, 42, 43, 53, 54

[56] References Cited

U.S. PATENT DOCUMENTS

| | | | |
|---|---|---|---|
| 757,800 | 4/1904 | Williams | 290/55 |
| 1,115,376 | 10/1914 | Baker | 405/78 |
| 4,078,388 | 3/1978 | Atencio | 405/78 |
| 4,143,990 | 3/1979 | Atencio | 405/78 |
| 4,165,467 | 8/1979 | Atencio | 405/75 |

FOREIGN PATENT DOCUMENTS 1514995  6/1978  United Kingdom .................. 290/55

*Primary Examiner*—J. V. Truhe
*Assistant Examiner*—Shelley Wade
*Attorney, Agent, or Firm*—Emory L. Groff, Jr.

[57] ABSTRACT

A hydropowered bulkhead assembly is provided for association with damming or analogous structure defining a water passageway through either non-navigable dams, movable-type dams, chambers at locks defined for navigation procedures, canal drops or auxiliary locks and includes a selectively displaceable body to achieve asynchronous electric generation when disposed in an operative position relative the damming structure. Flow controlling means, such as tainter gates, chanoine wicket gates, miter gates, and the like are included and operable to permit overhauling of the assembly or when in an idle status. Alternatively, a plurality of asynchronous generators may be spliced together in any one bulkhead assembly to enhance the generation quality, dependent upon the requirements imposed by extreme, highly variable hydraulic heads.

13 Claims, 10 Drawing Figures

HYDROPOWERED BULKHEAD

The present invention relates to means for achieving the maximum hydroelectric potential which can be realized at small existing dams.

An aim of the invention is to employ the electric asynchronous (induction) generation mode in massive terms including at those hydro sites having highly variable low hydraulic heads.

Because there are about 2,850 small dams having concrete structures and heads below 6 meters within the geographic U.S.A. territory, asynchronous generation at these sites will provide a defined clear advantage on the EHV (Extreme High Voltage) electric transmission networks having a defined line leading reactive capacitance load as inroduced by the magnetizing current supplied therein. This line capacitance can be offset by the addition of a plurality of small hydroelectric asynchronous generators, providing a noticable stabilizing effect on transient electrical transmission performances, thus avoiding the expensive alternative of providing costly shunt reactors. Other advantages of asynchronous generation are achieved by the present invention and defined hereinbelow.

The rotor of the hydroelectric generator is of the standard squirrel cage construction and is therefore extremely robust and reliable. It is not normally required to incorporate any specific value of flywheel effect on same, which can be easily defined to withstand operation at overspeeds. The result is a minimum generator weight for a given output and speed. Voltage and frequency are controlled by the electric system and the leading of the machine is realized by means of the turbine controls or especially by operation of gates as suggested in this invention.

Overloading of the machine is difficult since the generator will not accept reactive power in excess of that necessary for exciting and excitation purposes when delivering a predetermined electric output. The electric system acts as a "brake" to prevent the generator from accelerating beyond its rated speed. This technical fact is very valuable when hydraulic heads and the resultant motorizing fluidic flow passing through the motive turbine runners increases beyond its rated maximum scheduled numerical parametric magnitude. Consequently, expensive equipment for automatic voltage regulation and speed governing and synchronization is not required but it is usually necessary to utilize an overspeed trip on the prime mover or to actuate a movable gate, or set of gates, as suggested in this invention.

With the present arrangement, the voltage wave is free from harmonics and the machine has very good damper action. Electric generation efficiency figures are high and compare favorably with the corresponding figures of synchronous machines having the same speed and output. Simple relay protection equipment is adequate. In the event of a shortcircuit on the bars of machine terminals, the generator looses its excitation and consequently, the short circuit current disappears and ceases to feed the fault. There is no tendency for the asynchronous (induction) generator to feed into the fault.

Additionally, maintenance is simple because of the absence of sliprings, commutator and brushes and only occasional inspection of roller bearings is necessary. In machines having water lubricated bearings, this latter requirement is dispensed with.

Despite all of the above advantages, asynchronous generation has not been popularized and substantial small hydroelectric resources remain untapped to this day. This is due partly because the type of energy generated at small hydro plants is not especially attractive.

Natural flows in rivers and streams are highly variable with concerned variations of hydraulic heads at these sites having dams less than 6 meters high. In certain areas during the driest two months of the year, river flows are one-tenth of the flows during the wettest two months of the year, on the average. Thus, the small hydroelectric plant has been found to have little worth as a source of dependable power capacity. However, an engineered arrangement as suggested in U.S. Pat. No. 4,165,467 issued Aug. 21, 1979 and entitled "DAM WITH TRANSPORTABLE HYDROELECTRIC STATION" could suitably be used to cope with this undesirable hydrological drawback, to complement the features of the present invention.

Achieving full utilization of all of the annual river flow is not a simple matter when synchronous generation is involved at small sites and economics dictates the installation of only one high-powered machine in order to reduce costs. There is a lower limit of machine capability which must be accounted for during operation of hydraulic turbines at low river flow discharges, which often results in an inefficient, poorly defined and often rough performance. Such operation over long periods is not recommended nor guaranteed by manufacturers of electromechanical components.

In the case of low head turbines, those having heads less than 15 meters in magnitude, this limit is fixed at about 40% of the maximum rated machine flow discharge. But if asynchronous (induction) generation is utilized, economic factors then permit splitting the scheduled available hydroelectric potential capacity of a given site between a plurality of equally small powered units which results in a better operative utilization throughout the more important portion of the annual available river flow as well as during the remainder of the year. This potential, instead of being only 50% for just one machine, is about 80% for two identical machines and goes up to 95% when the scheduled power potential is spliced or joined between three identical machines, having the same engineered design.

These requirements are typical for hydrological features of the rivers in the New England and Mid-Atlantic areas of the U.S.A. and represent a sizable potential for developing asynchronous generation at existing dams.

Economics in asynchronous generation is further improved if the involved electric generator set is of the capsule-mounted type, either positioned upstream or downstream respective the turbine runner, and whether in a verticalized or horizontalized disposition. These generators can be made of the water-cooled type, having water-lubricated sleeve type bearings with the capsule being filled with treated water and substantially fully isolated from the polluting waters of the surrounding media. Before installation, such a machine is filled with clean neutral water. This water lubricates the bearings and also cools the electric windings and the generator can be installed at any depth fully submerged. A pressure compensating device will guarantee that any expansion of the water filling which takes place when the machine reaches its maximum temperature, is retained and this prevents surrounding contaminated or alkaline water from entering due to the temperature drop when the machine cools after it is stopped.

A sand guard and double seal protects the machine from the ingress of sand and all water-lubricated bearings need no maintenance irrespective of short or long working periods.

Thus, it is an aim of the present invention to provide a fully submerged squirrel cage slender "wet rotor" asynchronous generator design with watertight electric windings and which does not require any stuffing boxes, diving bells, forced cooling auxiliary means, split tubes, and the like thereby minimizing maintenance requirements and overhauling procedures with their related outages and loss of operative efficiency.

The resultant more compact arrangement facilitates the utilization of the assembly according to U.S. Pat. No. 4,143,990 issued Mar. 13, 1979 and entitled "DAM WITH MOVABLE HYDROELECTRIC STATION", within the framework of the present invention, especially at small head existing dams actually available along U.S.A. navigable waterways.

When air-cooled asynchronous generators are utilized, another aim of the present invention involves the use of a right angle motive drive such as invented by J. Haefele in Germany 47 years ago. This disposition couples the motive turbine with the electric generator which is located outside the water conveying conduit thereby enabling the electrical machine to be accessible from above the water line. This represents a departure from present technology involving the traditionally capsule-mounted air-cooled electric bulb generator in that the electric generator is no longer housed in a hermetic capsule but is mounted externally of the water conduit.

While the conventional bulb type arrangement has many advantages, the repair and maintenance of an air-cooled generator instead, presents a number of difficulties which are componded if the machine is small and does not permit the approach of maintenance crews for overhaul purposes. In a particular disposition defined by this invention, right angle driven air-cooled generators are housed within the main body of the bulkhead structure resulting in a solid, compact, rugged, portable design as shown in the accompanying drawings, and to be described later.

Another aim of the present invention concerns bulkheads having water-cooled generators disposed in a substantially coplanar arrangement with one or a plurality of asynchronous generators respectively embodied along the center-line of the draft tube conduits or diffuser and downstream of the turbine runner location. This design requires that the diameter of the generator be quite reduced, having a diameter substantially one-half or less than that of the turbine runner. This configuration is feasible today, utilizing slender water-cooled asynchronous generators because undesirable hydrodynamic transient performances of exhausting fluidic flows are minimized thereby inducing a smooth fluidic flow along the diffuser conduit. This substantially coplanarly arranged disposition will be elaborated upon in the accompanying description.

Another aim of the present invention is concerned with asynchronous electric generation on dam spillways, while maintenance is being accomplished on tainter gates or other fluid flow controlling means belonging to the spillways. Alternatively, this maintenance may occur when the apparatus is in an idle status and the gates are not being utilized for fluid flow controlling procedures such as when the river flow is depleted.

In support of the foregoing, a transportable hydropowered bulkhead is defined, adapted to be juxtaposed against the intake open end of a spillway's vanes, navigation lock passage, navigable passage or a low head movable type dam having movable chanoine wicket gates, siphon conduits defined above a fixed crested dam, unused auxiliary navigation passage left aside for future expansion of navigation tonnages on existing waterways, sluicing conduits on dams, canal drops and the like.

Each time a spillway's tainter gate, a lock's miter gate, submergible tainter gate or emptying sector gate, chanoine wicket gate or chanoine-Pascaud movable gate, Bebout self-tripping wicket vane, Beartrap dam's vanes, Boule dam's gate, spillway's siphon conduit and the like requires maintenance or is in an idle, non-operative status without flood water passage therethrough, the hydropowered bulkhead defined by this invention may be juxtaposed on the upstream open end to close the respective water passage gap. In this manner electric generation may be simultaneously realized while the gates or flow controlling means are not being utilized or are being subjected to maintenance and overhauling.

Another further aim of the present invention is concerned with the improvement of the asynchronous generation quality in itself, namely the power factor (cos phi) and the electric efficiency, while the generator is performing under part loads.

The improvement of both these electric features, is particularly desirable at low head dams, or at dams having a variable hydraulic head throughout the year.

Since, for the given rated design load of any asynchronous generator the power and reactive components are fixed, the induction generator will operate at a definite power factor irrespective of the system characteristics. The addition of induction generators to an existing electric system supplied by synchronous machines makes the power factor of the synchronous machines more lagging. This is due to the reduction in the generated active power of the synchronous machines by the amount of power added to the system by the induction generators while, on the other hand, the reactive component of the synchronous machines is increased by the amount necessary to excite and supply the magnetization component required by these induction generators.

In situations where it is essential to avoid any decrease in the power factor of the electric system because of induction generation, a bank of condensers must be installed to provide the induction generator with the bulk of its excitation current. This is rather a costly alternative and tends to complicate the installation, the chief characteristic of which should be simplicity and maximum economy. Further complications arise when induction generators operate at partial load ratings, introducing very low power factors within the electric network, with the partial load ratings being induced on the motive turbines by reduced, exhausting hydraulic heads.

Thus, in the above instances asynchronous generation becomes undesirable and perhaps impossible at electric networks of reduced dimensions and consequently, at small dams having small heads in isolated areas without powerful thermal or nuclear generating stations in the vicinity.

Because much of the hydroelectric output of small head dams, up to 50% or more at certain sites, is expected to be produced at intermediate heads between 66% to 33% of the maximum head, economics of induction generation will be enhanced if such low power factor is improved at partial load generation ratings. To realize this, it is proposed that the electrical generation machine comprise a plurality of spliced or joined together less powerful machines which, in total, have the same power output of the turbine runner to which they are connected. In other words, the added rated power of each of these smaller machines coincides with the rated delivered output of the motive turbine.

For the sake of simplicity, it will be assumed that the turbine output is coupled with two spliced induction generators one of which is more powerful and is rated at substantially $\frac{2}{3}$ (66%) of the turbine full output and the remaining one being rated at substantially $\frac{1}{3}$ (33%) of the same full turbine output.

By controllably connecting and disconnecting the plurality of generators from the electric network, in a selective way imposed by the regulations defined by a variable hydraulic head, it is possible to enhance the power factor and the efficiency of the energy flowing within the network and the status of the generation process respectively, Both generators will be operative by the same turbine runner, while the hydraulic head depletes from 100% full rated maximum numerical magnitude, down to $\frac{2}{3}$ (66%) of the same magnitude. At $\frac{2}{3}$ head, the less powerful generator is disconnected from the network and generation is followed with only the $\frac{2}{3}$ rated machine until the head depletes further down to $\frac{1}{3}$ (33%) of its maximum rated numerical magnitude. At $\frac{1}{3}$ head the most powerful machine is disconnected from the network while the $\frac{1}{3}$ machine is in turn connected to same and electric generation is followed below heads having $\frac{1}{3}$ (33%) or less numerical magnitude.

The reverse sequence is followed as the hydraulic head increases from below $\frac{1}{3}$ (33%) rated magnitude, up to 33% then to 66% and up to the full 100% full rated magnitude.

With the above, power factor and electric efficiency generation improves in two stages: at $\frac{2}{3}$ head because the $\frac{2}{3}$ generator performs at full electric output and at $\frac{1}{3}$ head because the $\frac{1}{3}$ generator performs at full electric output. This will be shown in the drawings to be described hereinbelow.

Another aim of the present invention involves a self displaceable hydropowered bulkhead assembly which is controllably submerged or emerged to allow juxtaposition against either a dam fluid flow passageway, the sill of a movable type dam, the opening for navigation passage in an unused lock, or with an auxiliary lock. This design can be arranged following the teachings defined on the combination of the U.S. Pat. Nos. 4,078,388 dated Mar. 14, 1978, Transportable Hydromotive Assembly and 4,073,146 dated Feb. 28, 1979, Submersible Diffuser.

Self displacement of the hydropowered bulkhead is feasibly achieved by motorizing the contained electric generators which acting as motors, induce tractive power upon the turbines which then act as propellers to controllably displace the bulkhead assembly respective a dam body. This displacement occurs between two extreme defined positions: the first functional one at full juxtaposition the dam body and the second one at a full idle status by mooring and anchorage means at the shore.

An additional objective of this invention deals with a substantially co-planarly defined bulkhead assembly designed to be functionally juxtaposed against movable type dams or intakes of siphon like conduits located at the crest of dams.

The adaptable bulkhead of this invention is flotatably displaced between two extreme positions. The first operative one, at which generation is realized in full juxtaposition and the second one a non-energetically operative position defined at shore or anchorage walls by mooring means secure against floods.

From the second position the assembly is controllably directed along a predetermined navigable path until near juxtaposition the upstream face of the movable dam. At this stage, it is slightly controllably submerged until its horizontally disposed bottom face contacts the sill face of the concrete slab defining the main supporting dam body at which wicket gate members are movably attached.

Peripheral damming extensions defined at each side of each of a plurality of bulkheads allows isolation of the gates of the concerned portion of the movable dam at which generation is expected to be achieved. These damming peripheral extensions are positioned between adjacent gates because their forwardly, outwardly extreme projecting faces are defined to be embodied between the spaces left by a set of two adjacent gates thereby defining an intermediate fully enclosed pool. Until this stage, the hydraulic head is supported by the wicket vanes of the movable dam. This is so until at least one gate is rotatably displaced to its lowest position, thus destroying the intermediate pool with the pool water level being depleted. Now the hydraulic head is progressively supported by the damming structure of the bulkhead as the pool depletes.

Consequently, a horizontally defined hydraulic thrust is induced into the bulkhead assembly which is slightly displaced until the vertical portion of its bottom face contacts the juxtaposed face of the dam's sill.

To achieve a first operative position the remaining gates are progressively lowered to fully open the movable dam structure and water is allowed to pass through the motive turbines to induce actuation thereof once the asynchronous generators are connected to the electric network. To stop the above generation, the wicket gates are raised in a reversed sequence and the hydraulic head is progressivly depleted while being by-passed from the damming structure of the bulkhead to the gates of the movable dam which are now in a raised position.

To disengage the subject bulkhead assembly away from juxtaposition the damming structure, flotation is induced within its body by admission of compressed air or gas within any number of a plurality of watertight compartments defined within the bulkhead. Motorizing of the runners to act as propellers permits to define a directed reversed displacement by navigation of all bulkheads until a second position is realized. Towing means can alternatively be employed instead of this self motorizing.

Movable blades of the Kaplan type on some of these runners will allow a better control of the magnitude of the thrust induced within the bulkhead body in order to displace it to the second position and alternatively to the first position.

All of these sequences are automatically directed by sensors acting according to the regulations imposed by the hydraulic heads and in response to the relative position of the bulkheads respective the dam body.

Advantages of the co-planar design permits realizing a very stable status during navigation, a better contacting juxtaposition status, stable positioning while in generation and a very compact design when combined with siphon conduits.

Relating now to the disclosed Figures, preferred and defined practical embodiments of the invention are disclosed in the following accompanying drawings as follows.

Similar reference characters designate corresponding parts throughout the several figures of the drawings.

Figure 1:
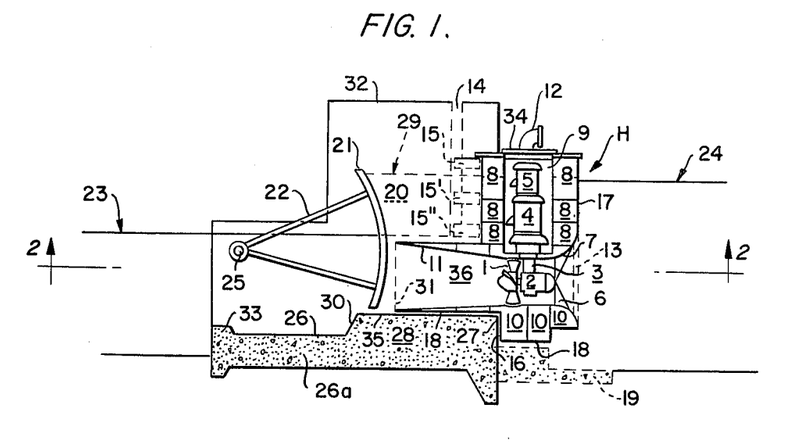
FIG. 1 is a schematic representation of a hydropowered bulkhead assembly according to the present invention having a right angle drive of the J. Haefele design, shown in juxtaposed combination with the vane of the spillway of one non-navigable dam having a tainter gate; comprising a longitudinal vertical cross section through the body of the bulkhead, along the turbine axis following the line 1—1 of FIG. 2.
Figure 2:
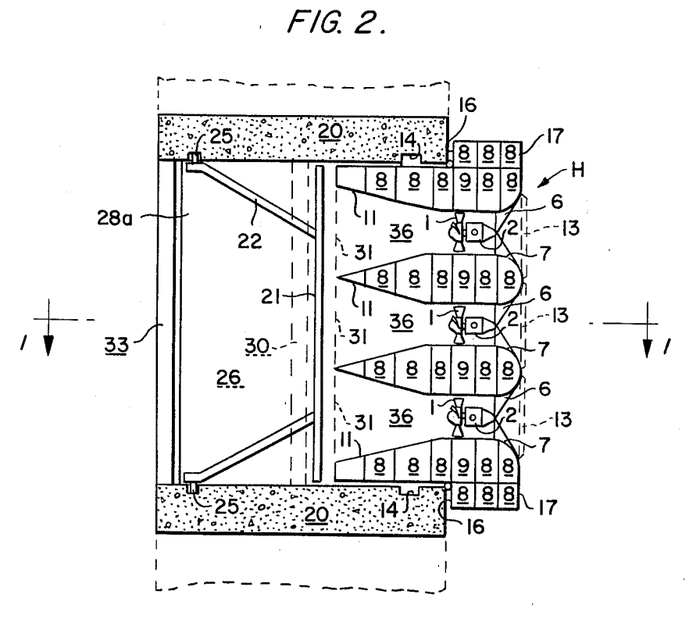
FIG. 2 represents a horizontal transverse cross section co-planarly taken along the axis of a plurality of turbines and along the line 2—2 of FIG. 1.

FIGS. 1 and 2 disclose a hydropowered bulkhead assembly H including an asynchronous electric generation set comprising a turbine runner 1 driving a rotational speed increaser bevel gear assembly enclosed within the structural body 2 and designed to provide the mechanical combination of a low rotational motive turbine runner 1 with a high speed rotational generator 4, herewith spliced into a set of two coaxially arranged generators 4–5 having a combined power output equalling the output of the runner 1 and connected with an axis 3 to the body 2.

The set of two generators 4–5 is housed within a machine hall chamber 9 and are air-cooled with air admitted through the ventilation duct 12 defined in the cover 34 which also provides access to both generator machines for maintenance.

A generally fixed vane distributor 6 is located upstream of the turbine runner 1 between the intake open end 13 and turbine cross sectional area of the bell-shaped intake conduit defined by the walls 7.

The turbine runner may optionally be fitted with fixed blades as a propeller or with movable blades such as in a Kaplan type runner. Between the turbine area and the exhausting second open end 31, the peripheral wall 11 defines a diffuser 36 or draft tube layout as is well known in the art. The intake first open end 13 has a relatively large cross sectional area and may be provided with suitable stop log or trashrack means while the diffuser outlet 31 is constructed to provide the largest cross sectional area feasible between the plurality of parallel assemblies sited between peripherally defined piers 20 of the dam body 28. The spillway sill bottom face 35 of the vane and the mean average tail water level 23 are also most clearly shown in FIG. 1 of the drawings.

The conduit defined by walls 7 and 11 embodies the venturi shaped conduit within which the turbine is located at the smallest cross section area.

Walls 7 and 11 defining the conduit 36 and chambers 9 defining the machine halls, are partly or fully surrounded by chambers 8 acting as hermetic means for buoyancy if filled with gas or air and by chambers 10 acting as ballast means for providing a stabilized status while the assembly H is in navigation. All of these hermetic structural cellular means are in turn embodied within the peripheral wall 17 and bottom wall 18 of the bulkhead body. In FIGS. 1 and 2, the hydropowered bulkhead H is shown functionally positioned for electric power production at a point immediately upstream a tainter gate 21 closing the primary fluid flow conveying means 26 and defined as a vane of the spillway of a non-navigable dam body 28. The vane 30 and gate 21 are utilized for directing a fluid flow therethrough while a flood status exists in the river.

The gate 21 is controllably rotatably displaceable around the pivots 25 located on piers 20 while supporting members 22 connect the gate frame to these pivots. In the arrangement in both FIGS. 1 and 2, the hydraulic head differential between the upper water level 24 and lower tailwater level 23 is supported by the bulkhead body wall 17 shown in juxtaposed combination within the fluid passage opening 28a of the body 28.

This dam body 28 in turn is suitably structured to include an underlying support slab 26a of the stilling basin of the spillway vane, defined between the sloping face 30 and apron 33. The bulkhead body 17 has support faces 16 fitted against the face 27 of the dam when positioned as shown and optionally the bottom wall 18 is defined to contact a secondary supporting slab 19 against which the full vertical thrust of the assembly H is realized by filling the chambers 8 with liquid, thereby insuring a positive juxtaposed engagement.

Once full juxtaposition is achieved, the gate 21 may be raised by suitable cranage means (not shown) or other means. The intermediate transient water pool 29 progressively decreases down to the tailwater level 23 and the entire hydraulic head 24–23 is then supported by the bulkhead assembly H.

Optionally, the vertical thrust may be absorbed by supporting the diffuser bottom face 18 upon the spillway sill's bottom face 35 while emergency auxiliary bulkhead closure means 15,15',15", serving as complementary supporting means, assist in absorbing the horizontal thrust and are inserted in slots or recesses 14 defined within the vertical piers 20. This occurs while the vertical face 16 of the bulkhead body contacts the lowermost sill face 35 as shown in FIG. 1. This arrangement allows the assembly to be constructed of a minimal mass.

As indicated, the hydraulic head 24-23 induces a motive fluid flow to enter the intake first open end 13 of the conduit 7 and to produce actuation of the turbine runner 1 after being directed by the vanes of the distributor 6 and following the annular path defined between the capsule body 2 and wall 7. After that, dynamic energy of the fluid flow is substantially recovered along the diffuser conduit 35 before exhausting through the outlet second open end 31.

When the blades of the turbine 1 are of the fixed type, the starting and stopping sequences of the hydroelectric sets are achieved by actuation of the spillway's gate 21 and optionally by gates (not shown) which may be fitted at the intake open end 13.

The bulkhead assembly H is entirely displaceable away from juxtaposition the dam body 28. In this respect, gate 21 is closed and chambers 8 are filled with compressed air or gas to apply an upwardly directed force upon the body 17 until the bottom faces 18 are slightly disengaged away from contact with the supporting faces 19,35. After this, the asynchronous generators 4–5 are energized from an independent electric source either at shore or sited above on a barge to act as motors, whereupon the turbines act as propellers to apply a defined thrust to the bulkhead assembly H, which displaces it by navigation from a first juxtaposed position to a second extreme position defined by appropriate anchorage means or mooring devices at shore or at concrete or cofferdammed structures which permit the bulkhead to be anchored in an idle status safe against floods. The disengaged bulkhead can also be passed to another dam.

A reversal of the sequence of procedures permits automation between a second idle position and a first operative one, all of this according to the regulations imposed by sensors acting pursuant to hydraulic head variations or as maintenance or repairs as needed on the electromechanical components of these hydropowered bulkheads.

Figure 3:
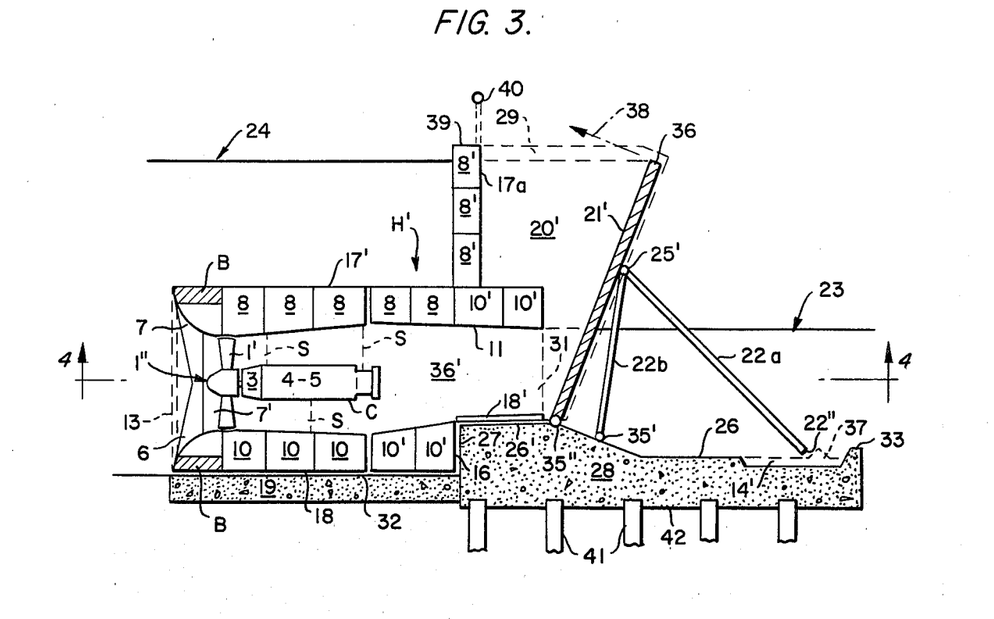
FIG. 3 represents a longitudinal vertical cross section through a substantially co-planarly defined hydropowered bulkhead assembly having the generators within the draft tube conduit and downstreamly of the motive turbine runner, shown in juxtaposed combination with the sills of a movable type dam having chanoine wicket gates taken along the turbine axis and following the line 3—3 of FIG. 4.
Figure 4:
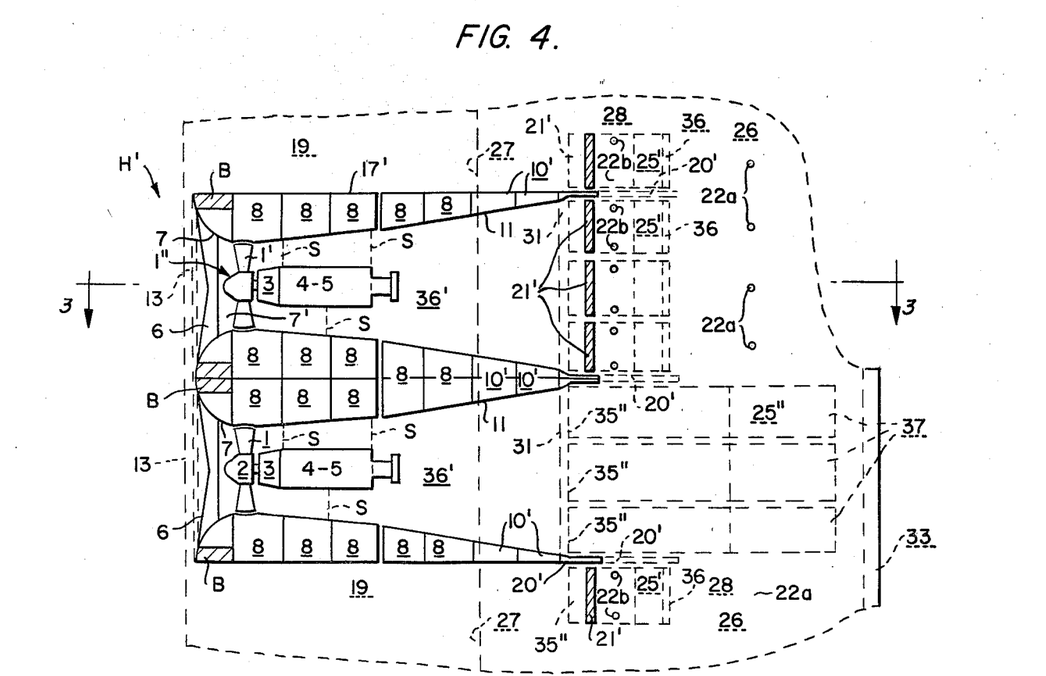
FIG. 4 represents the bulkhead assembly of FIG. 3 according to a horizontal transverse cross section taken along the axis of all turbines and following the line 4—4 of FIG. 3.

Another embodiment of this invention which deals with hydroelectric generation at movable type dams having wicket gates, is disclosed in FIGS. 3 and 4 of the drawings. In this installation, wicket chanoine gates 21' are supported by horses 22a having an arm 22b which is rotatably affixed at axis 35'. Optional rotation may be provided around axis 35" at the lower end of the gates 21'. In the first arrangement, the gate body 21' is rotatably defined around the axis 25' belonging to the horse support 22a, 22b. The lower end 22" of the horse is displaceable along a hurter 14' having a stop shoulder 37 against which end 22" is abutted when the gate body 21' is in the raised position as shown in full lines of FIG. 3, and in the four upper gate portions of FIG. 4, said portions belonging to the movable dam.

To lower each gate 21' a force is directed along the line from the gate's top 36 from the bulkhead deck 39 by suitable traction means at 40 which raises the end 22" of the horse from shoulder 37 and after this, the gate 21' is flatly positioned against the face 26 of the dam body 28 as depicted in dotted lines in the three lower gate portions of FIG. 4. These latter gate portions will be understood to belong to the selected part of the movable dam at which hydropower is to be realized.

In a reversed procedure, to raise the gates the same force is applied at the top end 36 of gate body 21' until the horse member end 22" engages in front of the shoulder 37 of the hurter slot 14'.

In FIG. 4, two full combinations involving six wicket gates of the movable dam are depicted, three of them being in the raised position as shown in FIG. 3 while the remaining three gates are in the flat, lowest position 25".

The hydromotive set of this bulkhead is generally constructed according to the Huguenin type arrangement which was first reduced to practice in Germany some 45 years ago and its main feature deals with a bulb capsule-mounted generator fully disposed within the water conveying conduit. A departure from the Huguenin design (Swiss Pat. No. 172,467 dated Jan. 24, 1935) comprises the placement of a bulb generator in a downstream relationship respective the turbine runner, instead of upstream thereof as practiced today.

In this departed design normally a hydraulic shaped contour must be developed in model tests which successfully prevents the bulb capsule and surrounding shaft draft conduit portions from interferring with the decelerated flow while the generation mode is followed and to produce excellent hydraulic efficiency along the diffuser conduit. This efficient performance is enhanced by the present proposed co-planar design. To this, asynchronous generation is introduced first as depicted in this invention, while the wet-cooled "slender type" of induction generator is embodied secondly and provide the two basic technical steps to be followed to realize this improved design.

This hydropowered bulkhead as combined with the navigable pass of a movable type dam includes an asynchronous generation set comprising a turbine runner 1" having a hub with blades 1' driving an axis 3 directly and mechanically combined with a generator 4, or a plurality of generators 4-5 housed within the capsule C and all coaxially mounted along the center line of the diffuser conduit 36' and substantially centered by supporting members S with the conduit. The generator's capsule C has a diametrical magnitude substantially about 0.5 or less than that of the turbine runner diameter so as to produce very little disturbance of the hydrodynamic performance of the exhausting fluid flows along the draft tube conduit 36'.

A fixed gated distributor 6 is upstreamly defined respective the runner 1" between the intake open end 13 and the turbine location and within the bell shaped conduit defined by walls 7. The turbine is provided with fixed blades 1' as a propeller and optionally movable blades as a Kaplan type runner.

Between the conduit's turbine area 7' and the outlet second open end 31, a peripheral wall 11 defines the diffuser 36' fully embodying the capsule C and generator 4-5. The intake open end 13 with its large cross sectional area preferably includes well known stop log and trashrack means while the diffuser outlet 31 is defined having the largest cross sectional area feasible to be provided between a plurality of parallel assemblies H'. The dam body 28 includes a bottom face 26' on the spillway sill as shown in FIG. 3 while the mean average tailwater level is defined at 23 in its most depleted position.

Conduits 7' and 36' as defined by the walls 7 and 11 will be seen to define a venturi-like shaped conduit within which the turbine is functionally disposed in coincidence with the smallest cross sectional area. The walls 7 and 11 defining the conduit are partly or fully surrounded by chambers 8 acting as buoyancy means if filled with air or gas and by chambers 10-10' acting as ballast means for stabilization while the assembly H' is in navigation. All these hermetic, structural, cellularly defined means are in turn embodied within the top peripheral walls 17' and bottom walls 18,18' and the vertical support wall 16. A damming portion 17a includes hermetic chambers 8' and a top deck 39 with traction means disposed thereabove at 40 to produce actuation of the gates 21' by force directed along line 38 at the tops 36 of same.

Damming portion 17a is preferably located in the vicinity of the conduit open end 31 to enhance stability of the bulkhead assembly H' juxtaposed the dam structure as in FIG. 3.

Heavy, solid, ballast means B are disposed around the intake open end 13 to induce the body 17',18 to assume a vertical position after the downstream chambers 10' are filled with gas to allow for maintenance on the generators 4-5. In this position, the capsule C can be extracted from the conduit 7',36' by cranage means through the open end 31. This feature represents another advantage of the subject co-planar design.

Optionally, a reversed spatial position can be realized on the body 17',18 by filling the upper chambers 8 with water and the lower chambers 10-10' with air in order to induce a 180° rotation around the axis of the turbine and generators for purposes to be detailed later.

In FIG. 4, the co-planar bulkhead is shown functionally juxtaposed the vertical face 27 and horizontal sill face 26' of the dam body 28, contacting respectively the vertical 16 and horizontal 18' walls. Thusly positioned, generation is realized by turbine 1'-1" and machines 4-5 while the respective gates 21' are flatly disposed in their lowest position 25" above the sill 26 and apron 33 of the dam's body 28 as supported by piles 41 on face 42. This flat position has been already achieved by actuation of the supporting members 22a,22b involving rotation about axis 25' or 35" as already described.

Alternately, the generator set 1',1", 4,5 will be idle when the respective gates 21' are in the raised position, as shown in FIG. 3, and an intermediate pool 29 is defined behind these gates and between the peripheral wall extension 20'-20' and the bulkhead body damming portion 17a. This idle status exists since there is no hydraulic head to motorize the turbine runner 1" and the gates preclude fluid flow discharges over the sills 26-26' of the dam 28.

The hydraulic head as defined between the upstream water level 24 and the tailwater level 23 is supported by gates 21' while no generation is being realized and by the damming portion 17a of the bulkhead assembly while in generation. Thus, actuation of these gates permits starting or stopping the generators or allows control at overspeeds as required.

Optionally, to enhance the juxtaposed relationship between the assembly H' and dam 28 an auxiliary or secondary slab 19 having an upper face 32 can be defined to engage with the bulkhead bottom 18 once the chambers 8 and 10-10' have been filled with water thereby inducing a full verticalized thrust on the assembly.

Hydraulic head 24-23 induces motive fluid flows to enter the first open end 13 of conduit 7' and is directed by vanes 6 of the distributor until influencing the blades 1' of runner 1" prior to following the annular path defined between the generator's capsule C and the draft tube wall 11 of the diffuser conduit 36' after which they are exhausted through the second open end 31.

Once the gates 21' are opened by rotation about axis 25' (optionally 35"), by motive pull 38 on their tops 36, thence turbines 1'-1" are progressively rotatably movably motorized until the rotational speed coincides or is slightly greater than the synchronous concerned speeds and generators 4-5 can be automatically connected to the electric network to induce actuation therein.

In the lower part of FIG. 4, a portion of the river flow is directed to produce power from the generators 4-5 while in the upper portion of same, no river flow is allowed to motorize turbines 1'-1" and their generators 4-5. As these upper-most gates are progressively lowered an increased number of generators are committed to produce power and the full river flow will be in a powered status until the flood season arrives at which time, the hydraulic head 24,23 will be so reduced that no power will be feasible below heads of 1.8 meters to 1.5 meters.

Displacement from a first active position to second idle position has been defined already. Herewith, primary damming means are defined by the plurality of gates 21' and secondary ones by bodies 17a and peripheral walls 20'.

Figure 5:
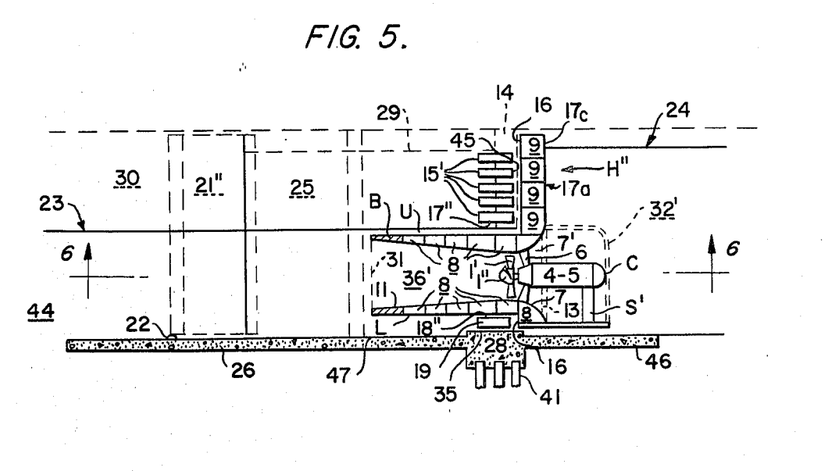
FIG. 5 represents a hydropowered bulkhead assembly having a conventional layout with its generators upstreamly sited relative the turbine runners and positioned in juxtaposition against emergency closure bulkheads partly closing the navigation passage of an auxiliary lock with the closure bulkheads being fitted within vertical recesses defined peripherally in the walls of the chamber of the lock, and comprising a longitudinal vertical cross section along the turbine axis of a set having a slender type generator design taken along the line 5—5 of FIG. 6.

Another practical embodiment of the juxtaposed hydropowered bulkhead assembly is adapted to be utilized at locks defining navigation passages through dams or alternatively, through uncompleted auxiliary lockage means left aside as navigation passages for future navigation tonnage expected on existing waterways of inland rivers. This modification is shown in FIGS. 5 and 6 of the drawings wherein the bulkhead assembly H" is combined with primary damming means comprising a set of miter gates defining an enclosed chamber containing the vessels and barges to be passed through the dam, or a combination involving sector gates, miter gates, submergible tainter gates and the like, as it is well known in the art.

Secondary damming means are herewith defined by a plurality of temporary closure bulkhead bodies, each one fitted within recesses or slots located in the vertical peripheral walls belonging to the upper approach section or alternatively, the culvert intake section walls of the navigation lock in the upstream side of same. If positioned on the downstream side, this secondary damming means may be fitted on culvert discharge section peripheral walls or alternatively, lower approach walls. All of these peripheral walls will be understood to define the navigable passageway through the dam while the temporary closure bulkhead bodies or frames are piled each one over the other and are energetically functionally combined with one auxiliary-complementary hydropowered bulkhead arrangement as defined by this invention.

With this arrangement, the secondary damming means is divided between two portions, the first one being of the fixed type and fitted within the slots or recesses while the second one is of the movably-displaceable type as defined by the hydropowered bulkhead body H".

Figure 6:
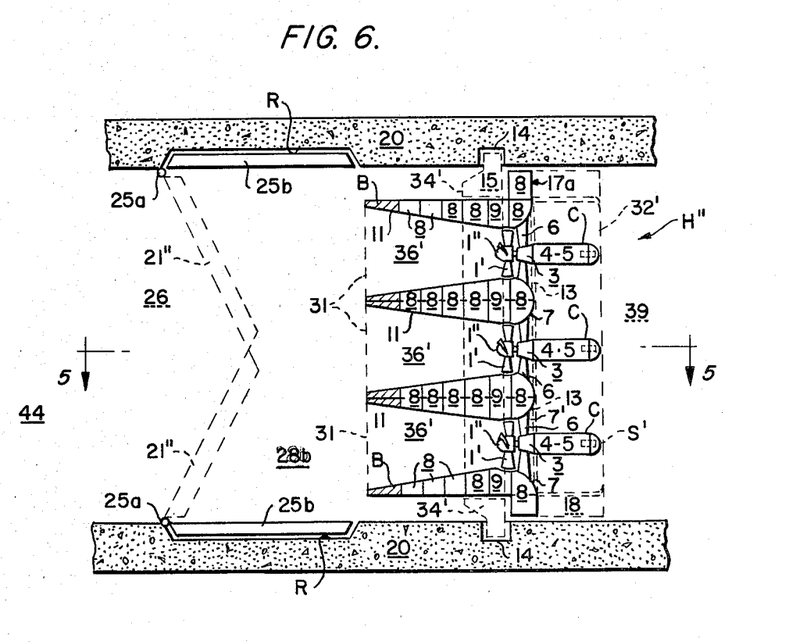
FIG. 6 represents the assembly shown in FIG. 5 and comprises a horizontal transverse cross section along the axis of all of the turbine generator sets and taken along the line 6—6 of FIG. 5.

This hydropowered bulkhead assembly H" will be seen to include one or a plurality of asynchronous generation sets with three such sets being depicted in FIG. 6. Each set includes a turbine hub runner 1" with either fixed or movable blades 1' and which is mechanically directly connected by axis 3 to a generator 4. Alternatively, in situations having highly variable hydraulic heads, a plurality of these asynchronous generators 4-5 etc. may be included within the substantially hermetic capsule C, which is upstreamly located relative the turbine runner 1" following the conventional Huguenin arrangement.

A distributor 6 supports one extreme portion of the capsule C and is located within the intake conduit 7' having a wall 7 downstream of the intake 13 or 32' with the remaining extreme portion of the capsule being supported by member S' joined to the bulkhead body bottom wall 18.

Hermetic chambers 8 define an upwardly directed force on the bulkhead body for flotation purposes to stress relieve the action of cranage means or alternatively, to ease the automatic displacement of the assembly H" between two defined extreme positions.

Structural cellular chambers 9 define the secondary damming action. The damming portion 17a includes a face 17c on the pool side and a downstreamly defined face 16 on the temporary closure bulkhead frame side.

Ballast means B allow balancing of the weight of the generators 4-5 etc. respective the body center line while the bulkhead is in a navigation mode. A conduit 36' defines a diffuser conduit having walls 11 and a second open end 31.

The above components define a displaceable hydropowered bulkhead assembly serving as a secondary damming complementary structure capable of being disposed against the face 45 of support frames 19,15,15' etc. belonging to the temporary closure bulkhead.

Normally, the bulkhead frames are available as standard components to be fitted at the upstream sides and the downstream sides of the lock chamber 44 when maintenance must be carried out upon the miter gates of the lock, or at other appurtenances of same, thereby isolating the water bodies of the upstream pool 24 and the tailwater pool 23.

The chamber 44 is defined between a set of two miter gates 21"-21" shown in FIG. 6 by broken lines in a closed position and which after being rotated about pivot means 25a-25a are embodied at the positions 25b-25b within recesses R-R as shown in full lines.

The temporary closure bulkhead frames 15,15" are piled upon one another within the recesses 14-14 defined within the peripheral walls 20-20 of the lock as shown.

A departure from conventional construction will now be introduced. This departure consists of an intermediate special temporary bulkhead closure frame 34' having a hollow design and adapted to be disposed above the first conventional temporary closure bulkhead frame 19 located above the sill face 35 belonging to the sill bulkhead support body 28' located on foundation piles 41 and below the lowest conventional temporary closure bulkhead frame 15'.

Because of the particular hollow design of this frame 34', an intermediate space is left and made available between the upper face 18" of frame 19 and the lower face 17" of lowest frame 15'. This space is so defined that the entire diffuser body 36' may be fitted therethrough while the bulkhead assembly H" is being displaced by directed navigation.

The diffuser body upper face U and the diffuser body lower face L are vertically so spaced apart that they may be fitted between the frames 19 and 15' without interference. This introduction is realized until the approaching movable face 16 of damming body 17a contacts the fixed face 45 of the bulkhead frames.

In this stiuation, a defined secondary damming arrangement has been typified on the upstream side of the lock chamber 44 as disclosed in FIGS. 5 and 6. The disposition shows a very reduced verticalized vessel's lift between the tailwater pool 23 and the upper pool 24, a condition which will be typical for asynchronous generation installations having very variable reduced hydraulic heads. If higher heads are committed, this disposition must be realized on the downstream side of the chamber 44.

Displacement of the assembly H" is achieved while the miter gates are in the closed position 21"-21" defining a transient intermediate pool 29 over the bottom concrete slab 26 of the culvert intake portion of the lock, upstream the gates 21"-21" and downstream the bulkhead frames 15-19, between the peripheral walls 20-20 serving as the culvert intake walls.

Once fully juxtaposed, the culvert intake gates are opened and the pool 29 depletes until equalizing the downstream tailwater level 23. Optionally, water can be introduced within the chambers 8 and 9 to impart a downwardly defined force on the bulkhead assembly permitting full contact between its bottom 18 and L and concrete slab faces 46 and 47 respectively. In this regards, engineered structure must be realized on the assembly shown in FIGS. 5 and 6 which are not depicted.

Once depletion of the pool 29 has been realized, a first extreme operative position is achieved. Motive water passing through the turbines 1'-1" are evacuated either along the culvert conduits, or through the opened gates 25b-25b. A reversal operative procedure is to raise the intermediate pool 29 until equalling the upstream level 24 in order to stop the generators or to induce control at overspeeds, as required.

Alternatively, gates in the intake open end 13 could be displaced to achieve the same control.

A second extreme, idle, non-operative position is obtained once the assembly H" has been displaced away from the illustrated position and the navigable passageway and is located at a remote site such that the bulkhead assembly H" may be secured safe against floods or made accessible for overhaul and maintenance.

Displacement between the two extreme positions can be automated by remote control sensors and directing means pursuant to requirements imposed by variable hydraulic heads by transient overspeed regimes, by maintenance requirements and electromechanical components, etc.

Figure 7:
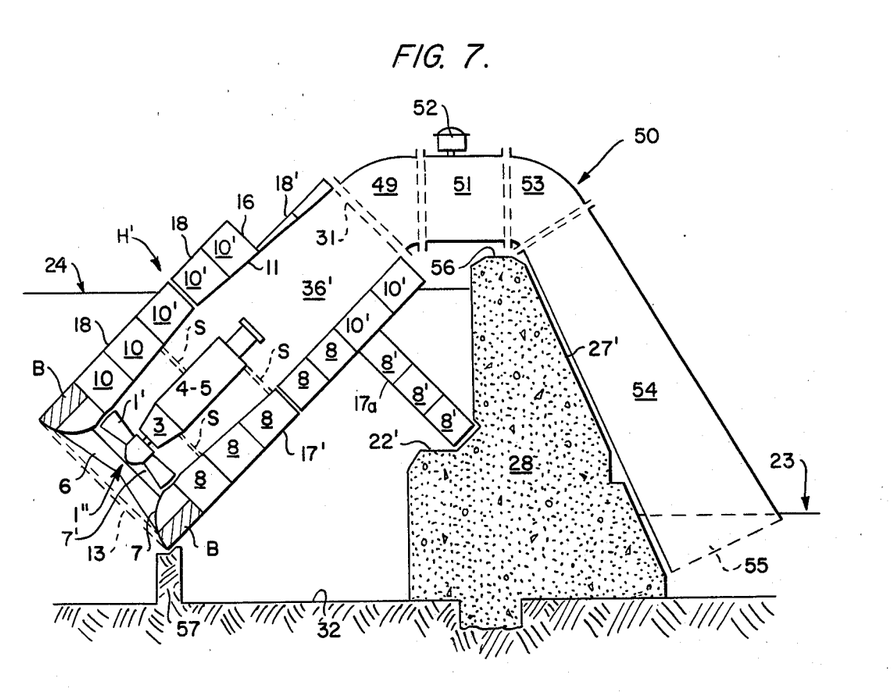
FIG. 7 represents the same bulkhead assembly shown in FIGS. 3 and 4 in an alternate juxtaposition against a siphon conduit following a rotation of about 180° in its body around the turbine axis.

Another embodiment of the co-planar bulkhead design is shown in FIG. 7 and comprises an adaptation of the bulkhead assembly H' employed in the installation of FIGS. 3 and 4. In this arrangement, the assembly H' is shown in energetic functional combination with the intake first open end 49 of a siphon conduit 50 having one horizontal branch 51 with a vacuum pump 52 for priming purposes and an angulated branch 53 connected to a descending branch 54 which in turn is juxtaposed the face 27' of a dam body 28. This conduit has an outlet open end 55 fully embodied within the tailwater body 23 such that fluid flows are directed over the crest 56 of the fixed, non-navigable dam body 28.

The co-planar bulkhead assembly H' is shown after a rotation of substantially 180° has been made around the central longitudinal axis thereof and after transportation from the movable-type dam of FIGS. 3 and 4 to the fixed crest dam of FIG. 7. In this new, reversed position chambers 10-10' are now filled with air instead of water while the chambers 8 are filled with water instead of gas so as to act as ballast means. The bottom 18 is in the top face now while the top face of FIG. 3 is on the bottom now. The damming secondary body 17a acts now as a frame support for the assembly body juxtaposed the faces 22-22' of dam body 28. An auxiliary support 57 is defined over the pool bottom 32 to support the open end 13 of the conduit 7'.

An advantage of this latter arrangement includes an extension of the annual time during which energetic utilization of the hydropowered bulkhead may be achieved, this extension being of a noticeable degree.

Running performance is started by priming the siphon conduit 50 by means of actuation of the vacuum pump 52 while stopping the set is realized by actuation of an exhausting valve co-located with the vacuum pump and which admits air within the conduit 50 until the flow of water stops and the machine is no longer influenced by the motorized turbine 1'-1" which will then be immobile.

Figure 8:
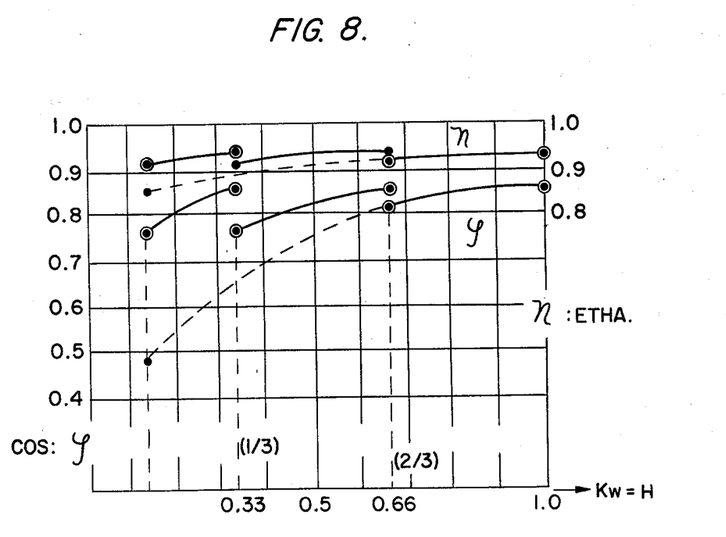
FIG. 8 depicts in a schematic manner, the improvement of the asynchronous generation quality according to the teachings of the present invention.

The diagrammatic illustration of FIG. 8 reflects the improved status realized by employing the asynchronous generation according to the various embodiments of this invention.

As already noted, spreading the asynchronous generation between a plurality of generators which are selectively employed as the hydraulic head progressively depletes below 100% as reflected in the horizontal axis of the graph of FIG. 8 produces a significant improvement on both the generation efficiency (ETHA) and on the power factor (PHI). The curved dotted lines represent the reduced performance if only one generating machine is involved with the upper lines reflecting the electric efficiency and the lower ones the power factor, each indicating between 100% full powered output down to only 15% powered output. As will be seen, the efficiency is reduced to 0.85 and the power factor down to 0.48 which represents a highly undesirable generation status.

The full lines on the other hand represent the improved performance obtained when the generation sets are coupled into a set of two machines with the first one having about 0.66 (⅔) of the full turbine power and the second one having about 0.33 (⅓) of the full turbine power. With this arrangement, both sets are connected between 100% full generation power down to 0.66 and then the first, bigger set is connected between 0.66 to 0.33 full turbine output while the 0.33 machine is idle in electrically defined terms or disconnected from the network. At the 0.33 output level, the 0.66 machine is disconnected from the network while the 0.33 machine is connected in its place and operates until the head depletes to the 0.16 mark. At both the 0.66 and 0.33 marks, performance enhances as it is well shown in full lines of FIG. 8. Generation is now feasible between 1.00 full hydraulic head down to only 0.16 head instead of only between 1.00 and down to 0.66 as would be the case with only one machine. The lines depicted in FIG. 8 are typical of a combined 400 kW. plus 200 kW assembly of generators with an operating rotational speed (50Hz) and having an overall 600 kW output.

Figure 9:
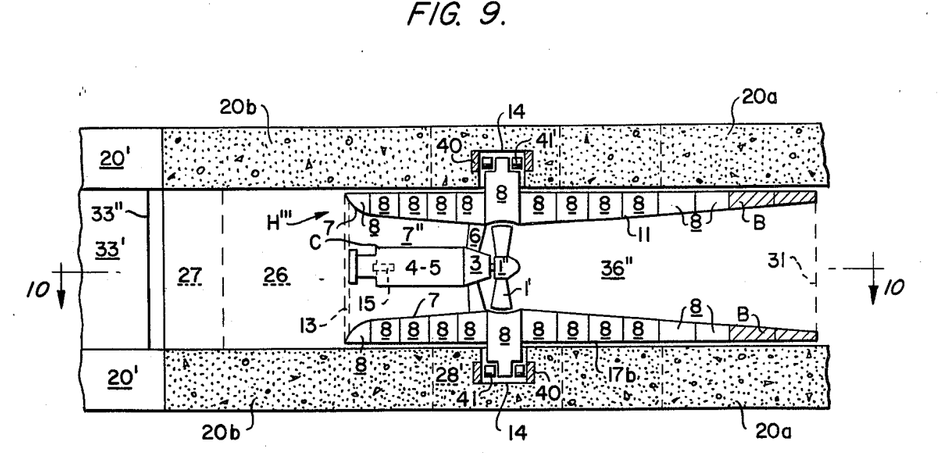
FIG. 9 represents a schematic layout of a drop canal hydropowered bulkhead assembly shown in juxtaposed combination with the bottom of a canal downstreamly of the drop and comprising a longitudinal horizontal cross section through the body of the bulkhead assembly along its turbine axis with the generator set being of the Huguenin design and taken along the line 9—9 of FIG. 10.
Figure 10:
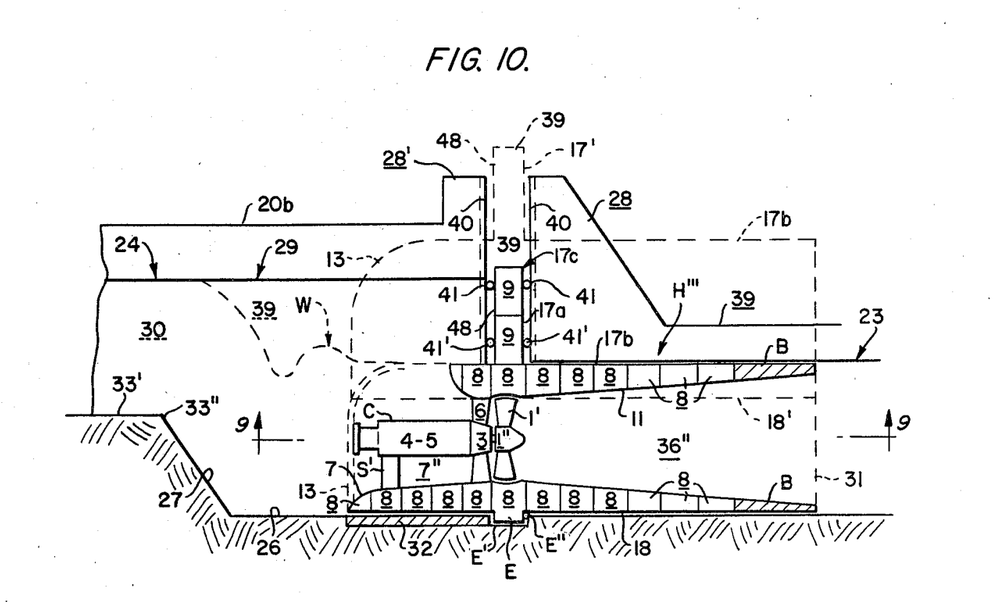
FIG. 10 represents a longitudinal vertical cross section through the body of the bulkhead assembly taken along the turbine axis and following the line 10—10 of FIG. 9.

The embodiment illustrated in FIGS. 9 and 10 relates to the employment of a displaceable hydropowered bulkhead assembly downstream of and in functional operativity with a drop in a canal. This arrangement is feasible in irrigation systems, and water circulation layouts at nuclear or thermal stations for refrigeration procedures at industrial centers having great water inputs/outputs within the framework and the like. These drawing figures reflect the combination of the hydropowered bulkhead assembly with the drop in an irrigation canal.

In this case, the primary damming means are defined by the peripheral walls and the bottom slab of the approaching fluid flow conveying means leading to the drop within the canal, this primary damming means being so located before the drop. No gated means are herewith required to regulate the amount of fluid flow running through the drop of the canal, however, the drop in itself performs as a spillway vane and has a bottom stilling basin which allows dealing with the dynamic energy of the falling waters such that a standing wave is formed in coincidence with the stilling basin as the dynamic energy is destroyed. In this instance, an arrangement is realized at which this dynamic energy of the falling waters is transformed into electric energy.

The displaceable hydropowered bulkhead H''' includes a secondary displaceable damming means defined by its body and adapted to be fitted at a point downstream of the drop canal spilling means. This displaceable bulkhead is vertically displaceable between two extreme positions, the first operative one comprising full juxtaposition between the bulkhead bottom face and the canal sill after the drop while a transient intermediate pool is retained by the secondary damming means. The second idle extreme position occurs when the bulkhead is displaced so as to destroy the intermediate transient pool and the hydraulic head is reduced to nil. This second position is depicted by dotted lines in FIG. 10. The conventional Huguenin design is illustrated in this embodiment with flotation means included in the bulkhead to facilitate the vertical displacement between the described two extreme positions. This displacement may utilize auxiliary cranage means, hydraulic piston rods or other means not shown in the drawings.

This hydropowered bulkhead assembly H''' is shown to include an asynchronous generation set having a turbine hub 1" with blades 1' connected by axis 3 to a generator 4 or plurality of generators 4-5 embodied within a capsule C. A distributor 6 supports one extreme portion of the capsule c and is located within the intake of the conduit 7" downstreamly of the intake open end 13 with the remaining extreme portion of the capsule being supported by member S' joined to the wall 7 of the intake conduit 7".

Hermetic chambers 8 define an upwardly directed force on the bulkhead body 17b for flotation purposes to stress relieve action of lifting cranage means or alternatively, to ease automatic displacement between the two extreme defined positions. Structural cellular chambers 9 are included in the secondary damming portion 17c with said damming portion having a face 48 on the upstream pool 24, 29 side and a downstream defined face 17a, while a top 39 is sited at the upper portion of same.

Ballast means B allows the balancing of the weight of the generator 4 respective the body center line while the bulkhead body 17b is in flotation status within the tailwater body 23. The conduit 36" defines a diffuser or draft tube having peripheral walls 11 and a second open end 31. An extension or support E within the canal bottom slot E' includes sealing means E".

The above components define a displaceable hydropowered bulkhead H''' as a secondary damming structure adapted to be disposed within a canal downstreamly of a drop in the canal. The canal drop in itself consists of an intake bottom 33' defined between two vertical peripheral walls 20' all acting as primary damming means to direct a fluid flow through the drop defined as having a crest 33", a sloping face 30' and a stilling basin 26, all defined within and between the peripheral walls 20a having banks 20b. Vertical peripheral walls are herein illustrated for the sake of simplicity but quite obviously, sloping walls can also be involved.

Before and after the drop, the free water levels are depicted at respective references 24 and 23, while a standing water wave is shown at reference W. The head differential 24-23 belongs to the available hydraulic head before hydroelectric generation is realized.

While the bulkhead assembly H''' is juxtaposed the first position, its bottom 18 face is supported by the canal bottom sill face 32 and the intermediate pool is levelized at 29, being retained by wall 48 of damming extension body 17c of the bulkhead assembly H''', and peripherally by wall portions 28', both embodying slots or recesses 14 with guide surfaces 40' upon which roller means 41' engage. These roller means are attached to the bulkhead body 17c in the area of the damming chamber portion 9 at both sides of same in order to direct the bulkhead body H''' while being verticaly displaced between its two extreme first and second positions.

The first juxtaposed position induces the pool 29 level to raise above the wave level W in a progressive way until the level 29 equalizes the incoming water level body 24 with the hydraulic head differential directing fluid flows through the intake conduit 7". This flow passes the runner 1" and actuates the axis 3 on generators 4-5 which are then electrically connected to the network once the rotational speed reaches the synchronous one, or is slightly above same. The tailwater level remains at the same position and excess waters are directed to flow over the face 39 on the upper side of body 17c to which suitable spillway means are associated (not shown).

Once an upwardly directed force is applied to the assembly H''', either by introducing compressed air or gas within the respective chambers 8 by cranage means or by actuation of piston hydraulic rods, or any other traction means, the second extreme position is achieved as shown in dotted lines in FIG. 10 upon which no more intermediate pool 29 exists. Thence, no hydraulic head differential 24-23 induces fluid flow passage through the conduit 7", 36" which now is in the raised position and mostly located outside of the water bodies 24, 23.

In this mode, the generation set stands idle and is available for maintenance and overhauling procedures. This second position, as said, permits maintenance upon the electromechanical components of the generation set or alternatively, is realized to permit control of overspeed rotational transient regimes, such as when a power trip from the electric network occurs. In this embodiment, usually only one generator 4 or 5 will be defined within the capsule C.

From the foregoing, it will be realized that an improved asynchronous generation is realized at portable bulkheads to be fitted at unused portions of dams, locks, canal drops, movable type dams and the like.

I claim:

1. A fluid body retaining damming installation including, fixed primary damming means and alternative complementary movable primary damming means, said fixed damming means defining a fluid passageway and said movable damming means controlling fluid flow therethrough, displaceable secondary damming means including a hydropowered bulkhead assembly having a conduit provided with a peripheral wall defining a fluid flow path through said assembly, said conduit having a first fluid intake open end and a second fluid exhaust open end, an energy generation unit within said assembly having motive means within said conduit adapted to be moved by fluid flowing through said conduit to actuate said energy generation unit, at least one said open end of said assembly conduit insertable within said fluid passageway in a juxtaposed manner to provide an energetic functional status therewithin, said hydropowered bulkhead assembly having displacement means therein operable to selectively displace said assembly and its secondary damming means between a first extreme position in said juxtaposed energetic functional status and a second extreme position with said assembly in an idle non-operative status fully removed from juxtaposed said fluid passageway, said displacement means including a plurality of selectively operable hermetic chambers and ballast means defining buoyancy of a volume at least sufficient to produce a spatial-controlled flotation or sinking status on said bulkhead assembly when gas or liquid is respectively admitted therein for achieving said displacement between said two extreme defined positions, and said hermetic chambers and ballast means optionally/alternatively operable to induce an angular rotation of said bulkhead assembly substantially about the horizontal axis of said conduit.

2. A fluid body retaining damming installation including, fixed primary damming means and alternative complementary movable primary damming means, said fixed damming means defining a fluid passageway and said movable damming means controlling fluid flow therethrough, displaceable secondary damming means positionable between an upper retained pool and a tailwater pool and including a hydropowered bulkhead assembly having a conduit provided with a peripheral wall defining a fluid flow path through said assembly, said conduit having a first fluid intake open end and a second fluid exhaust open end, an energy generation unit within said assembly having turbine motive means within said conduit adapted to be moved by fluid flowing through said conduit to actuate said energy generation unit, said energy generation unit of the asynchronous type employing magnetising reactive electric energy from an associated electric source, a hermetic capsule disposed within said conduit and containing said asynchronous energy generation unit, said capsule positioned adjacent said turbine motive means and having an external diameter substantially less than that of said turbine motive means at least one said open end of said assembly conduit insertable within said fluid passageway in a juxtaposed manner to provide an energetic functional status therewithin, said hydropowered bulkhead assembly having displacement means therein operable to selectively displace said assembly and its secondary damming means between a first extreme position in said juxtaposed energetic functional status and a second extreme position with said assembly in an idle non-operative status fully removed from juxtaposed said fluid passageway whereby, when said assembly is in said first extreme position said energetic functional status is progressively induced into said generation unit during a progressive build-up of the hydraulic head between said upper retained pool and tailwater pool.

3. A fluid body retaining damming installation according to claim 2 wherein, said plurality of electric generators comprises a set of two induction generators with one said generator electrically configured to handle substantially ⅔ the full powered output of said turbine motive means at the maximum rated hydraulic head and the other said generator electrically configured to handle substantially ⅓ the same said full powered output.

4. A fluid body retaining damming installation according to claim 3 wherein, both said asynchronous generators are electrically connected to an associated network to induce electric actuation therein while said turbine motive means is rotated by variable hydraulic heads substantially ranging between full maximum rated hydraulic head down to about ⅔ said maximum head, said ⅓ rated generator selectively electrically disconnectable from the said network as said ⅔ rated generator remains connected as said variable hydraulic head ranges between ⅔ and ⅓ said maximum rated head, and said ⅔ rated generator disconnectable from the said network while said ⅓ rated generator is connected to same when said variable hydraulic head is depleted below ⅓ said maximum rated hydraulic head.

5. A fluid body retaining damming installation according to claim 2 wherein, said movable primary damming means includes gated means adjacent said bulkhead assembly and at least partly defining a movable-type dam and said energetic functional status is achieved upon shifting of said gated means to an open position.

6. A fluid body retaining damming installation according to claim 2 wherein, said fixed primary damming means define a navigable lock chamber and alternatively an auxiliary unused lockage means receiving said secondary damming means, said movable primary damming means including gated means and gated appurtenances and said energetic functional status is achieved upon shifting of said gated means and gated appurtenances to an open position.

7. A fluid body retaining damming installation according to claim 2 wherein, said fixed primary damming means include fixed peripheral walls defining a canal, said canal provided with a bottom having a drop, said bulkhead assembly disposed upon said bottom downstreamly said drop and in coincidence with said fixed peripheral walls when in said first extreme position whereby, an hydraulic head is defined by said secondary damming means for active electric power production.

8. A fluid body retaining damming installation according to claim 1 wherein, an intermediate pool is established within said installation between said drop and said secondary damming means to produce said hydraulic head when said bulkhead assembly is in said first extreme position, and when said assembly is displaced to said second extreme position said intermediate pool is depleted as no hydraulic head is retained by said displaced assembly.

9. A fluid body retaining damming installation according to claim 1 wherein, said hermetic chambers and ballast means are selectively operable to induce a rotation of said bulkhead assembly defining a substantially 180° angular displacement substantially about said conduit axis.

10. A fluid body retaining damming installation according to claim 2 wherein, said energy generation unit includes a plurality of electric asynchronous generators actuated by said turbine motive means, and said plurality of generators having a total powered output substantially matching that of said turbine motive means.

11. A fluid body retaining damming installation according to claim 2 wherein, said capsule defines a diameter substantially one-half or less than that of said turbine motive means.

12. A fluid body retaining damming installation according to claim 9 wherein, said bulkhead assembly includes siphon-type spilling means.

13. A fluid body retaining damming installation according to claim 10 wherein, said generators are of the water-cooled type.

* * * * *